US008714859B2

(12) United States Patent
Munger

(10) Patent No.: US 8,714,859 B2
(45) Date of Patent: May 6, 2014

(54) CLAMPING ASSEMBLY THAT ACTS AS AN INTERFACE BETWEEN TWO COMPONENTS

(75) Inventor: Robert E. Munger, Sonoita, AZ (US)

(73) Assignee: Raytheon Company, Waltham, MA (US)

( * ) Notice: Subject to any disclaimer, the term of this patent is extended or adjusted under 35 U.S.C. 154(b) by 394 days.

(21) Appl. No.: 13/190,930

(22) Filed: Jul. 26, 2011

(65) Prior Publication Data

US 2013/0028654 A1    Jan. 31, 2013

(51) Int. Cl.
*F16D 1/08* (2006.01)
*F16D 3/80* (2006.01)
*F16L 17/00* (2006.01)

(52) U.S. Cl.
USPC .............. 403/31; 403/37; 403/322.2

(58) Field of Classification Search
USPC .............. 403/31–39, 322.2, 360, 375, DIG. 6
See application file for complete search history.

(56) References Cited

U.S. PATENT DOCUMENTS

| | | | | |
|---|---|---|---|---|
| 4,391,543 A * | 7/1983 | Elsing | ............................. | 403/24 |
| 4,511,065 A * | 4/1985 | Corsette | .................. | 222/153.13 |
| 5,603,353 A * | 2/1997 | Clark et al. | .............. | 137/614.01 |
| 5,868,032 A * | 2/1999 | Laskey | .......................... | 74/89.37 |
| 6,951,462 B2 * | 10/2005 | Kumar et al. | ................. | 433/174 |
| 7,389,756 B2 * | 6/2008 | Hoppe et al. | ................ | 123/90.17 |
| 7,762,739 B2 * | 7/2010 | Blanchard | .................. | 403/322.2 |
| 7,963,717 B2 * | 6/2011 | Seger | .......................... | 403/322.2 |

* cited by examiner

*Primary Examiner* — Gregory Binda
*Assistant Examiner* — Nahid Amiri
(74) *Attorney, Agent, or Firm* — Schwegman, Lundberg & Woessner, P.A.

(57) ABSTRACT

A clamping assembly which includes a first member that has a housing and a plunger that reciprocates within the housing. The first member further includes a first biasing member that biases the plunger in a first direction and a second biasing member that biases the plunger in a second direction that is opposite to the first direction. The first member further includes a bearing positioned within a cavity in the housing such that the bearing reciprocates within the cavity in a third direction that is partially orthogonal to the first and second directions. The plunger includes a first surface that applies a first force to the bearing that is at least partially in the third direction. The clamping assembly further includes a second member that includes a second surface that engages the bearing. The bearing applies a second force to the second surface of the second member that is at least partially in the second direction.

19 Claims, 6 Drawing Sheets

CLAMPING ASSEMBLY THAT ACTS AS AN INTERFACE BETWEEN TWO COMPONENTS

TECHNICAL FIELD

Embodiments pertain to a clamping assembly, and more particularly to a clamping assembly that provides an efficient interface between items being clamped together.

BACKGROUND

Many manufacturers struggle with efficiently moving complex assemblies from one assembly station to another. As an example, when an assembly is moved to a test station, there is typically an over abundance of time and labor that is associated with getting the assembly properly mounted to the test station. In addition, there is often a requirement that the assembly be aligned with a high degree of accuracy as the assembly is secured to the test station.

Therefore, an interface between assemblies and work stations is needed. The interface should permit the assemblies to be secured to the work stations in a relative quick and efficient matter with a high degree of accuracy.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
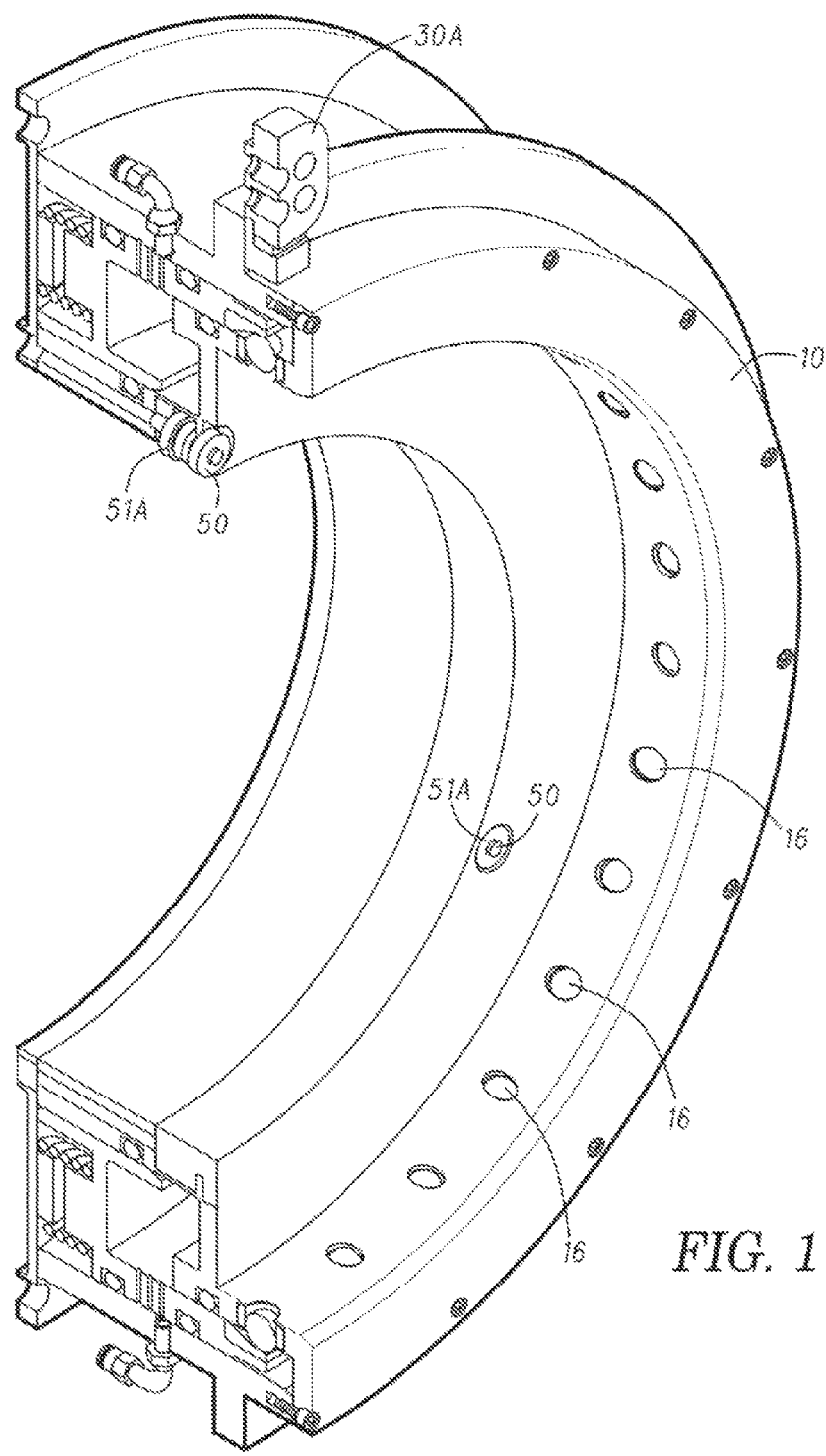
FIG. 1 is a perspective partial section view illustrating a portion of an example clamping assembly.
Figure 2:
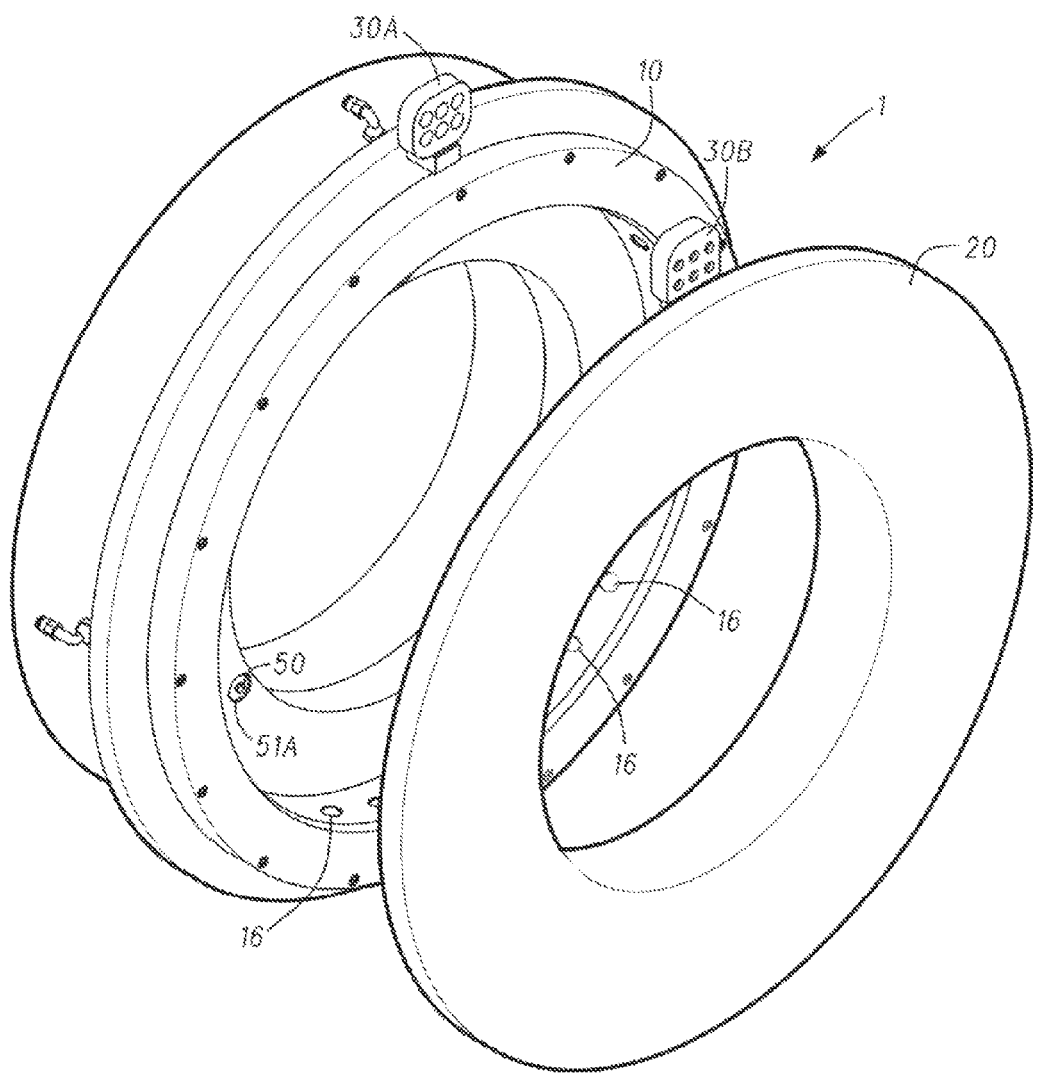
FIG. 2 is an exploded perspective view of an example clamping assembly.

FIG. 1 is a partial perspective section view illustrating a portion of an example clamping assembly 1. FIG. 2 is an exploded perspective view of the entire example clamping assembly 1.

Figure 3:
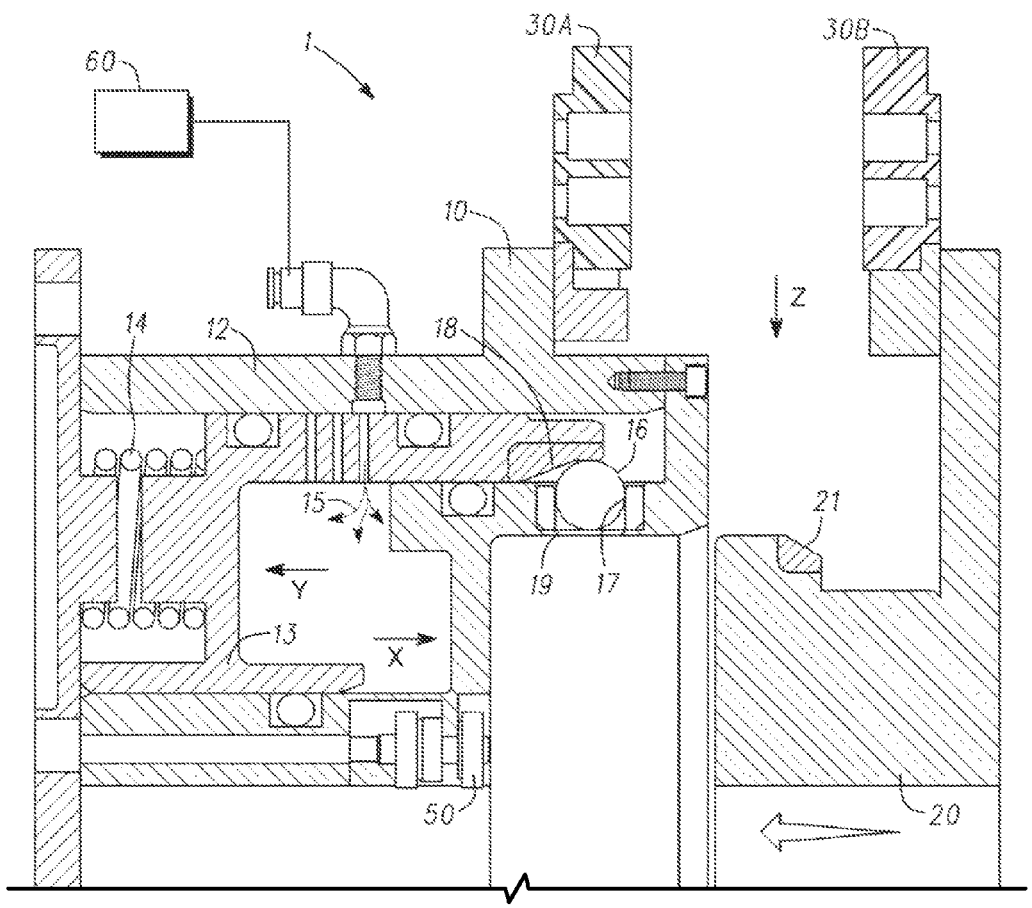
FIG. 3 is an enlarged section view of the clamping assembly shown in FIG. 2 where a second member is brought near the first member and the second biasing member is forcing a plunger in a second direction.
Figure 4:
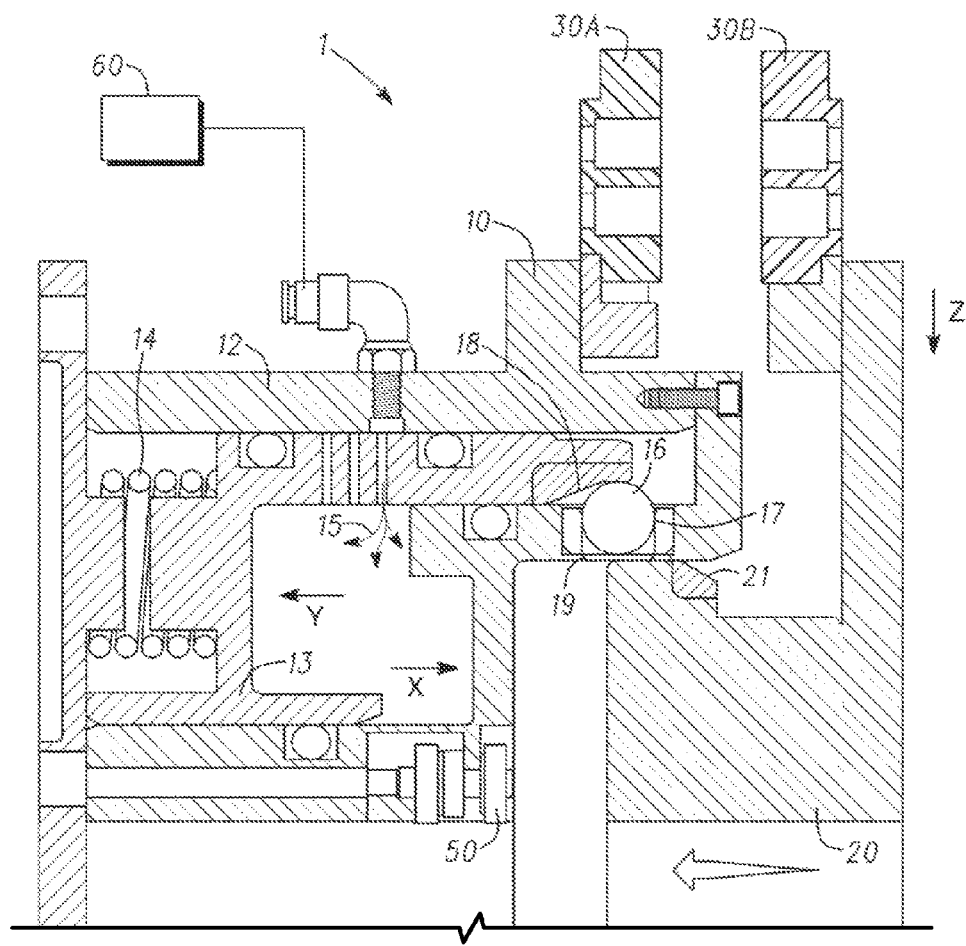
FIG. 4 is an enlarged section view similar to FIG. 3 of the clamping assembly where the second member is brought further near the first member and the second biasing member is forcing a plunger in a second direction.
Figure 5:
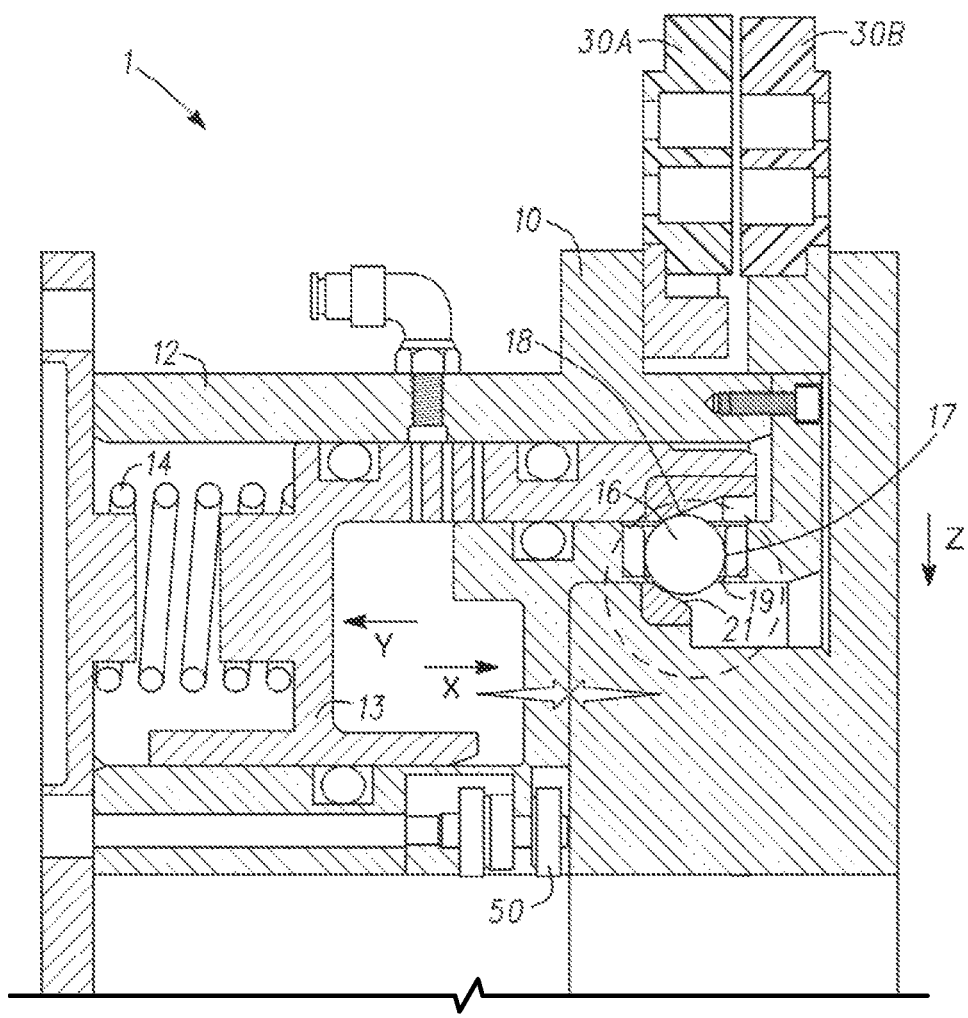
FIG. 5 is an enlarged section view similar to FIGS. 3 and 4 of the clamping assembly where the second member is compressed against the first member.

FIGS. 3-5 are enlarged section views of the clamping assembly 1 shown in FIG. 2. The clamping assembly 1 includes a first member 10 that has a housing 12 and a plunger 13 that reciprocates within the housing 12. The first member 10 further includes a first biasing member 14 that biases the plunger 13 in a first direction X and a second biasing member 15 that biases the plunger 13 in a second direction Y that is opposite to the first direction X.

The first member 10 further includes a bearing 16 positioned within a cavity 17 in the housing 12 such that the bearing 16 reciprocates within the cavity 17 in a third direction Z that is orthogonal to the first and second directions X, Y. The plunger 13 includes a first surface 18 that applies a first force F1 (see FIG. 6) to the bearing 16 that is at least partially in the third direction Z as the first biasing member 14 moves the plunger 13 in the first direction X.

The clamping assembly 1 further includes a second member 20 that includes a second surface 21 that engages the bearing 16. The bearing 16 applies a second force F2 (see FIG. 6) to the second surface 21 of the second member 20 that is at least partially in the second direction Y when the plunger 13 applies the first force F1 to the bearing 16. The second member 20 is compressed against the first member 10 as the bearing 16 applies the second force F2 to the second surface 21.

In the illustrated example embodiments, the first member 10 is a first ring 10 and the second member 20 is a second ring 20. It should be noted that other embodiments are contemplated where the first and second members have other sizes and/shapes. The type of members that are included in the clamping assembly 1 will depend in part on the application where the clamping assembly 1 is to be used.

In some embodiments, the housing 12 further includes a stop 19 (shown most clearly in FIG. 6) that prevents the bearing 16 from exiting the cavity 17. In some orientations of the clamping assembly 1, the bearing 16 would otherwise fall from the cavity 17 due to gravity if the stop 19 was not properly sized and located within the cavity 17 (shown most clearly in FIG. 6).

In the illustrated example embodiments, the first ring 10 includes a plurality of first biasing members 14 that bias the plunger 13 in the first direction X. As an example, the first ring 10 may include thirty compression springs 14 that are positioned at equal intervals around the first ring 10.

In addition, the first ring 10 may include a plurality of bearings 16 within a plurality of cavities 17 within the housing 12 such that the plurality of bearings 16 applies the second force F2 to the second surface 21 of the second ring 20 when the plunger 13 applies the first force F1 to the plurality of bearings 16. As an example, the first ring 10 may also include thirty bearings 16 that are positioned at equal intervals around the first ring 10. In some embodiments, the bearings 16 may be aligned with the compression springs 14 within the first ring 10.

In the illustrated example embodiments, the second biasing member 15 includes compressed gas 15 that engages the plunger 13 to move the plunger 13 in the second direction Y. FIGS. 3 and 4 show that the compressed gas 15 overcomes biasing force generated by the compressions springs 14, which is before the second ring 20 is engaged with the first ring 10.

In some embodiments, the first ring 10 includes a first electrical connector 30A and the second ring 20 includes a second electrical connector 30B. As shown in FIG. 5, the first electrical connector 30A may engage the second electrical connector 30B as the second ring 20 is compressed against the first ring 10 due to the bearing 16 applying the second force F2 to the second surface 21 of the second member 20.

Figure 6:
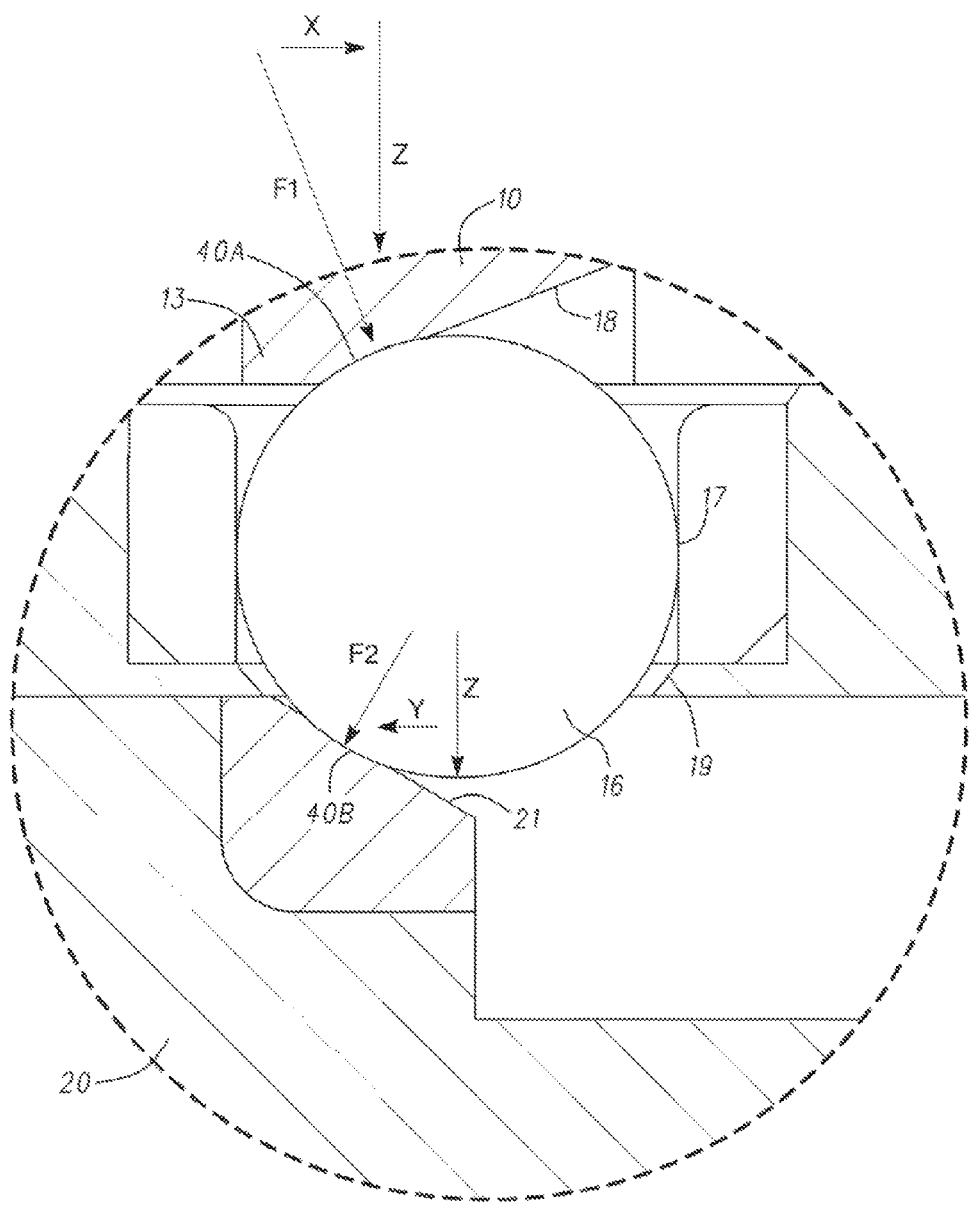
FIG. 6 is an enlarged section view illustrating the engagement between the bearing and the first and second members of the clamping assembly.

As shown most clearly in FIG. 6, the first surface 18 of the plunger 13 includes a detent 40A that receives a portion of the bearing 16 such that the bearing 16 is aligned relative to the first surface 18 when the bearing 16 is partially received within the detent 40A. In addition, the second surface 21 of the second ring 20 includes a second detent 40B that receives another portion of the bearing 16 such that the bearing 16 is aligned relative to the first and second surfaces 18, 21 when the bearing 16 is partially received within the first and second detents 40A, 40B.

It should be noted that the first surface 18 of the plunger 13 may be formed of a material that is softer than the bearing 16 and the second surface 21 of the second ring 20 may be formed of a material that is softer than the bearing 16. Depending on the particular materials that are used for the bearings 16 and the first and second surfaces 18, 21, the bearings 16 may elastically (and sometimes plastically) form the first detents 40A in the first surface 18 of the plunger 13 and the second detents 40B in the second surface 21 of the second ring 20.

In some embodiments, the first member 10 and/or the second member 20 includes a proximity switch 50 (FIGS. 3-5 show the first member 10 as including the proximity switch 50). In addition, the clamping assembly 1 may further include a control 60 (see FIGS. 3 and 4) that selectively activates the first and second biasing members 14, 15 as the second member 20 is clamped to the first member 10 based on signals received from the proximity switch 50. It should be noted that the clamping assembly 1 may include multiple proximity switches positioned at intervals around the first and/or second members 10, 20 in order to enhance the alignment between the first and second members 10, 20 of the clamping assembly 1.

During a clamping operation using the clamping assembly 1, the second member 20 is brought adjacent to the first member 10 (see FIG. 3). As shown in FIG. 4, the second member 20 is partially inserted into the first member 10. The control 60 inserts the compressed gas 15 to apply continuous pressure in the second direction Y to overcome the biasing force of the compression springs 14 thereby allowing the second member 20 to move past the bearing 16.

Once the proximity switch 50 determines that the first and second members 10, 20 are brought close enough to one another, the control 60 removes the compressed gas 15 to thereby allow the compression springs 14 to move the plunger 13 in the first direction X. The compression springs 14 move the plunger 13 in the first direction X until the first surface 18 of the plunger 13 applies the first force F1 to the bearing 16. It should be noted that the force F1 is at least partially in the third direction Z.

Once the force F1 is applied to the bearing 16 by the first surface 18 of the plunger 13, the bearing 16 moves in the third direction Z until the bearing 16 applies the second force F2 to the second surface 21 of the second member 20. It should be noted that the force F2 is at least partially in the second direction Y to compress the first and second members 10, 20 together.

The second member 20 is disengaged from the first member 10 by reintroducing the compressed gas 15 into the housing 12 such that the compressed gas 15 again overcomes the compression springs 14. Once the compressed gas 15 again overcomes the compression springs 14, the forces F1, F2 are removed from the bearing 16 thereby permitting the second member 20 to be removed from the first member 10.

It should be noted that other embodiments are contemplated where other types of biasing members besides compression springs and compressed gas are included in the clamping assembly. The type, size, location and style of the biasing members will depend on a variety of design considerations.

The clamping assemblies described herein may permit the assemblies to be secured to work stations in a relative quick and efficient matter with a high degree of accuracy. As an example, the first member 10 may be adapted to be engaged with a test machine and the second member 20 may be adapted to be engaged with a unit to be tested by the test machine.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A clamping assembly that acts an interface between two components, the clamping assembly comprising:
    a first member that includes a housing and a plunger that reciprocates within the housing, the first member further including a first biasing member that biases the plunger in a first direction and a second biasing member that biases the plunger in a second direction that is opposite to the first direction, the first member further including a bearing positioned within a cavity in the housing such that the bearing reciprocates within the cavity in a third direction that is partially orthogonal to the first and second directions, the plunger including a first surface that applies a radially inward first force to the bearing that is at least partially in the third direction as the first biasing member moves the plunger in the first direction; and
    a second member that includes a second surface that engages the bearing, the bearing applying a second force to the second surface of the second member that is at least partially in the second direction when the plunger applies the first force to the bearing, the second member being compressed against the first member as the bearing applies the second force to the second surface, wherein at least a portion of the second member is inside the first member.

2. The clamping assembly of claim 1, wherein the first member is a first ring and the second member is a second ring.

3. The clamping assembly of claim 1, wherein the housing further includes a stop that prevents the bearing from exiting the cavity.

4. The clamping assembly of claim 1, wherein the first member includes a plurality of first biasing members that bias the plunger in the first direction.

5. The clamping assembly of claim 4, wherein the plurality of first biasing members includes thirty biasing members.

6. The clamping assembly of claim 1, wherein the first member includes a plurality of bearings within a plurality of cavities within the housing such that the plurality of bearings applies the second force to the second surface of the second member when the plunger applies the first force to the plurality of bearings.

7. The clamping assembly of claim 6, wherein the plurality of bearings within the plurality of cavities within the housing includes thirty bearings within thirty cavities within the housing.

8. The clamping assembly of claim 1, wherein the first biasing member is a compression spring.

9. The clamping assembly of claim 1, wherein the second biasing member includes compressed gas that engages the plunger to move the plunger in the second direction.

10. The clamping assembly of claim 1, wherein the first member includes a first electrical connector and the second member includes a second electrical connector.

11. The clamping assembly of claim 1, wherein a first electrical connector engages a second electrical connector as the second member is being compressed against the first member as the bearing applies the second force to the second surface of the second member.

12. The clamping assembly of claim 1, wherein the first member is adapted to be engaged with a test machine.

13. The clamping assembly of claim 12, wherein the second member is adapted to be engaged with a unit to be tested by the test machine.

14. The clamping assembly of claim 1, wherein the first surface of the plunger includes a first detent that receives a portion of the bearing such that the bearing is aligned relative to the first surface when the bearing is partially received within the first detent, wherein the second surface of the second member includes a second detent that receives a portion of the bearing such that the bearing is aligned relative to the first and second surfaces when the bearing is partially received within the first and second detents.

15. The clamping assembly of claim 14, wherein the first surface of the plunger is formed of a material that is softer than the bearing and the second surface of the second member is formed of a material that is softer than the bearing.

16. The clamping assembly of claim 15, wherein the bearing forms the first detent in the first surface of the plunger when the first force is applied to the bearing, and the bearing forms the second detent in the second surface of the second member as the second force is applied to the second surface of the second member.

17. The clamping assembly of claim 16, wherein the bearing elastically forms the first detent in the first surface of the plunger and elastically forms the second detent in the second surface of the second member.

18. The clamping assembly of claim 17, wherein the bearing plastically forms the first detent in the first surface of the plunger and plastically forms the second detent in the second surface of the second member.

19. A clamping assembly that acts an interface between two components, the clamping assembly comprising:

a first ring that includes a housing and a plunger that reciprocates within the housing, the first ring further including a first compression spring that biases the plunger in a first direction and compressed gas that biases the plunger in a second direction that is opposite to the first direction, the first ring further including a bearing positioned within a cavity in the housing such that the bearing reciprocates within the cavity in a third direction that is partially orthogonal to the first and second directions, and wherein the housing further includes a stop that prevents the bearing from exiting the cavity, the plunger including a first surface that applies a radially inward first force to the bearing that is at least partially in the third direction as the first compression spring moves the plunger in the first direction;

a second ring that includes a second surface that engages the bearing, the bearing applying a second force to the second surface of the second ring that is at least partially in the second direction when the plunger applies the first force to the bearing, the second ring being compressed against the first ring as the bearing applies the second force to the second surface, wherein at least a portion of the second ring is inside the first ring; and wherein the first surface of the plunger includes a first detent that receives a portion of the bearing such that the bearing is aligned relative to the first surface when the bearing is partially received within the first detent, wherein the second surface of the second includes a second detent that receives a portion of the bearing such that the bearing is aligned relative to the first and second surfaces when the bearing is partially received within the first and second detents, wherein the bearing forms the first detent in the first surface of the plunger when the first force is applied to the bearing, and the bearing forms the second detent in the second surface of the second ring as the second force is applied to the second surface of the second ring.

* * * * *